United States Patent [19]

Trainer

[11] Patent Number: 4,648,274

[45] Date of Patent: Mar. 10, 1987

[54] PHOTOELASTIC MEASURING TRANSDUCER AND ACCELEROMETER BASED THEREON

[75] Inventor: Michael N. Trainer, Telford, Pa.

[73] Assignee: General Signal Corporation, Stamford, Conn.

[21] Appl. No.: 763,152

[22] Filed: Aug. 7, 1985

[51] Int. Cl.$^4$ .......................... G01L 1/24; G01B 11/18
[52] U.S. Cl. .................................... 73/517 R; 73/800; 350/371; 356/33
[58] Field of Search ................ 73/517 R, 800, 862.38, 73/862.64, 653; 350/371, 372, 373, 400, 401, 403, 404; 356/33, 34, 365

[56] References Cited

U.S. PATENT DOCUMENTS

| | | | |
|---|---|---|---|
| 3,077,813 | 2/1963 | Zandman | 356/34 |
| 3,950,987 | 4/1976 | Slezinger et al. | 73/517 R X |
| 4,123,158 | 10/1978 | Reytblatt | 73/800 X |
| 4,368,645 | 1/1983 | Glenn et al. | 356/33 X |
| 4,466,295 | 8/1984 | Wesson | 73/862.38 |
| 4,498,348 | 2/1985 | Wesson | 73/517 R X |
| 4,515,473 | 5/1985 | Mermelstein | 356/33 |

FOREIGN PATENT DOCUMENTS 1295239 6/1964 Fed. Rep. of Germany ........ 356/33

OTHER PUBLICATIONS

Boyer et al., Piezo-Optical Effect in Bi- and Tri-Dimensional Polarimetry, Optical Engineering, Jan./Feb. 1981, vol. 20, No. 1.
Spillman, Jr., Multimode Fiber-Optic Accelerometer Based on the Photoelastic Effect, Applied Optics, Aug. 1, 1982, vol. 21, No. 15.
Spillman, Jr. et al., Multimode Fiber-Optic Hydrophone Based on the Photoelastic Effect, Applied Optics, 10-1-82, vol. 21, No. 19.
Tai et al., Fiber-Optic Acceleration Sensor Based on Photoelastic Effect, Applied Optics, 6-1-83, vol. 22, No. 11.

*Primary Examiner*—Stewart J. Levy
*Assistant Examiner*—Scott M. Oldham
*Attorney, Agent, or Firm*—Harold Huberfeld; William G. Miller, Jr.

[57] ABSTRACT

A photoelastic transducer is constructed with a photoelastic element receiving a 45° polarized light beam with a wave plate providing a 90° phase displacement in its orthogonal components. The element has reflective surface coatings to produce multiple internal reflections so as to lengthen the optical path, and increase the sensitivity of the unit. Analysis of the orthogonal outputs can be according to the difference divided by the sum with one of the outputs being multiplied by the ratio of the D.C. component of the other output to its D.C. component, for the purpose of compensating for changes in tramsmission of the two signals. Alternatively, the signal analysis can be in accordance with the difference between the rates of change of the two signals with each rate of change being multiplied by a factor which is proportional to the square root of the ratio of the other signal to the present signal, for the purpose of compensating for changes in the wave plate dimensions due to factors such as temperature change.

14 Claims, 13 Drawing Figures

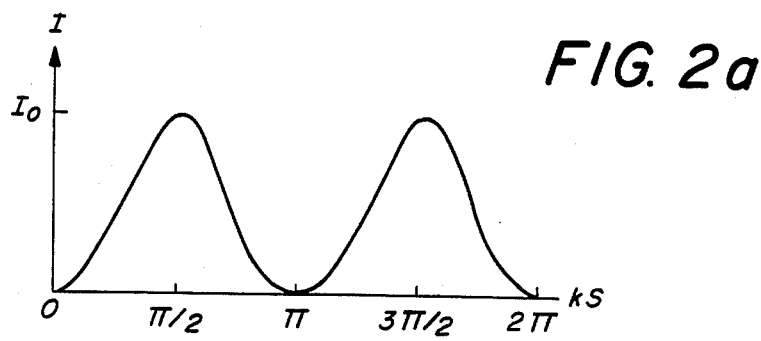
FIG. 2a
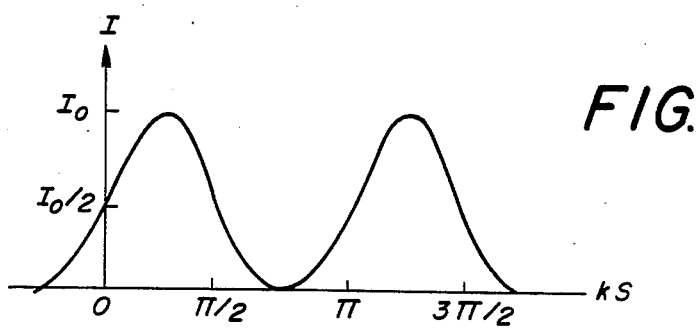
FIG. 2b
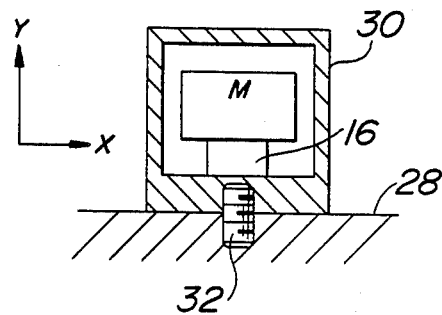
FIG. 3
FIG. 4
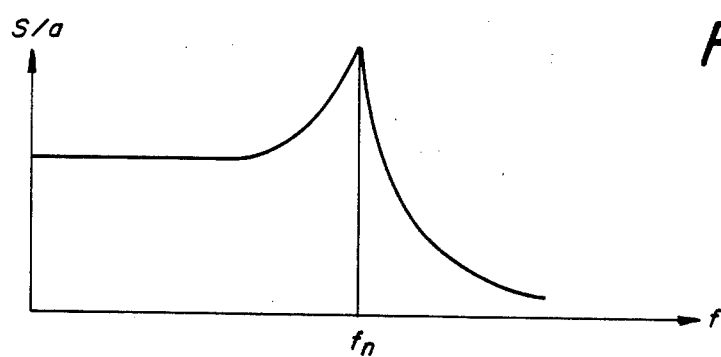

PHOTOELASTIC MEASURING TRANSDUCER AND ACCELEROMETER BASED THEREON

BACKGROUND OF THE INVENTION

The present invention relates to primary measuring transducers wherein mechanical stress variations in a photoelastic element, due to a variation in the value of a measured variable (such as acceleration, temperature, pressure, or other variables) are converted to electrical signals representing the value of the measured variable. Also, the present invention relates to improvements required for suitable operation of such devices when they cannot be close coupled to associated electronic measuring circuitry, as is necessary to avoid exposure to interference from strong electrical fields in the area where the measurements are being made.

Known accelerometers utilize an inertial mass coupled to a mounting structure through a photoelastic element which serves as a strain sensing material. Such a device is disclosed in U.S. Pat. No. 3,950,987 issued Apr. 20, 1976; where the transducer uses two polarized optical channels in a photoelastic element. Each channel has in addition to the common photoelastic element, a light source polarized at 45° from the stress axis, an analyzer, and a photocell. Both channels are provided with wave plates having their fast axis either perpendicular or parallel to the stress axis. The photocells receiving the light are connected in a differential relationship to provide a difference signal from the photocells, as a measure of the acceleration.

The disclosure of U.S. Pat. No. 3,950,987 is hereby incorporated by reference into this application.

Transducers of the type described in the above mentioned U.S. patent are useful in measuring any one of a number of variables such as temperature, pressure, and acceleration, as pointed out in the patent. Because of the use of two light beams, however, and the short path through the photoelastic element those measurements would not be of high accuracy or high sensitivity. The lack of accuracy would result from the fact that the two paths would have some unavoidable differences such as the angle of polarization, the inaccuracies in the thickness of the wave plates, the differences in the birefringence in the two paths in the photoelastic element, as may be caused by uneven stress distribution in the element, and the differences or inaccuracies in the angle of polarization of the analyzers. Since it is desired to utilize accelerometers of the general type disclosed in the patent for measuring the vibration of large machines, to determine if repair is needed, such measurements must be very sensitive and should be immune to large electrical fields, if they are to be useful. The needed immunity plus the usual need for multiplexing a number of the transducers into a common signal receiver at a centralized monitoring site in that type of application makes the system of the patent inadequate.

The needed immunity from large electrical fields can advantageously be accomplished by the use of optical fibers for signal transmission. This also makes possible the needed multiplexing. Such optical transmission, however, presents noise sources of its own which must be dealt with. The noise sources of interest when optical fibers are used include not only the fluctuations in intensity of the light source, which typically is a laser diode, but also fluctuating losses induced into the optical fiber due to motion of the fiber, as might be caused by vibration, for example. Examples of such vibration losses include those which are known as microbending and macrobending losses.

Noise due to microbending and macrobending losses presents a difficult problem in accelerometers of the photoelastic type because the photoelastic elements, as they are used in those accelerometers, provide a signal output which has a d.c. component which is large in comparison with the a.c. component (the one which varies with the measured variable). Thus, any noise present in the system that are multiplicative rather than being merely additive, such as light source variations, microbending and macrobending losses, will cause the signal representing the measured variable to be swamped and will make its measurement very difficult, if not impossible, under normal industrial conditions. It is, of course, not only desirable to minimize these noise effects themselves, but also it is desirable to acheive an improved acceleration sensitivity and frequency response, which in and of itself will help diminish the effects of any noise.

It is an object of this invention to provide an improved photoelastic tranducer and one which can be addressed by optical fibers to provide immunity from noise due to large ambient electrical fields while still allowing multiplexing of the outputs of a number of such transducers. It is also an object of this invention to accomplish such electrical field immunity while providing adequate sensitivity to the signal being measured and avoidance of another type of noise, that due to microbending and macrobending losses in the optical fibers.

SUMMARY OF THE INVENTION

In carrying out the object of this invention there is provided a photoelastic transducer which has a single beam which is analyzed in orthogonal planes. A reflective coating on the photoelastic element is used to produce multiple internal reflections of a light beam incident on the photoelastic element so as to increase the sensitivity of the unit by virtue of the longer path through the element. The effect of vibration induced noises from the fiber optics used to avoid electrical field pickup is overcome by determining the measured variable in accordance with the difference between the intensity of those beams or their rate of change of intensity.

BRIEF DESCRIPTION OF THE DRAWINGS

In the drawings, in which like reference characters represent like elements:

FIG. 2a is a plot of the relationship between the output optical power and the stress applied to the photoelastic body, when the wave plate is ommitted from the beam path of FIG. 1a.

FIG. 2b is a plot similar to FIG. 2a showing the shift in the plot produced by the inclusion of the wave plate.

FIG. 3 is a front elevation showing the normal mounting arrangement for an optical accelerometer.

FIG. 4 is a frequency response characteristic for the arrangement of FIG. 1a.

DESCRIPTION OF THE PREFERRED EMBODIMENTS

The operating principle of photoelastic transducers involves the use of stress induced birefringence, the photoelastic effect. Birefringence is an optical material means that its refractive index is dependent on the plane of polarization of the light it is transmitting. Using this principle, it is possible to detect the changes of any measured variable which can be represented as the magnitude of a stress applied to a photoelastic element.

Figures 1A, 1B:
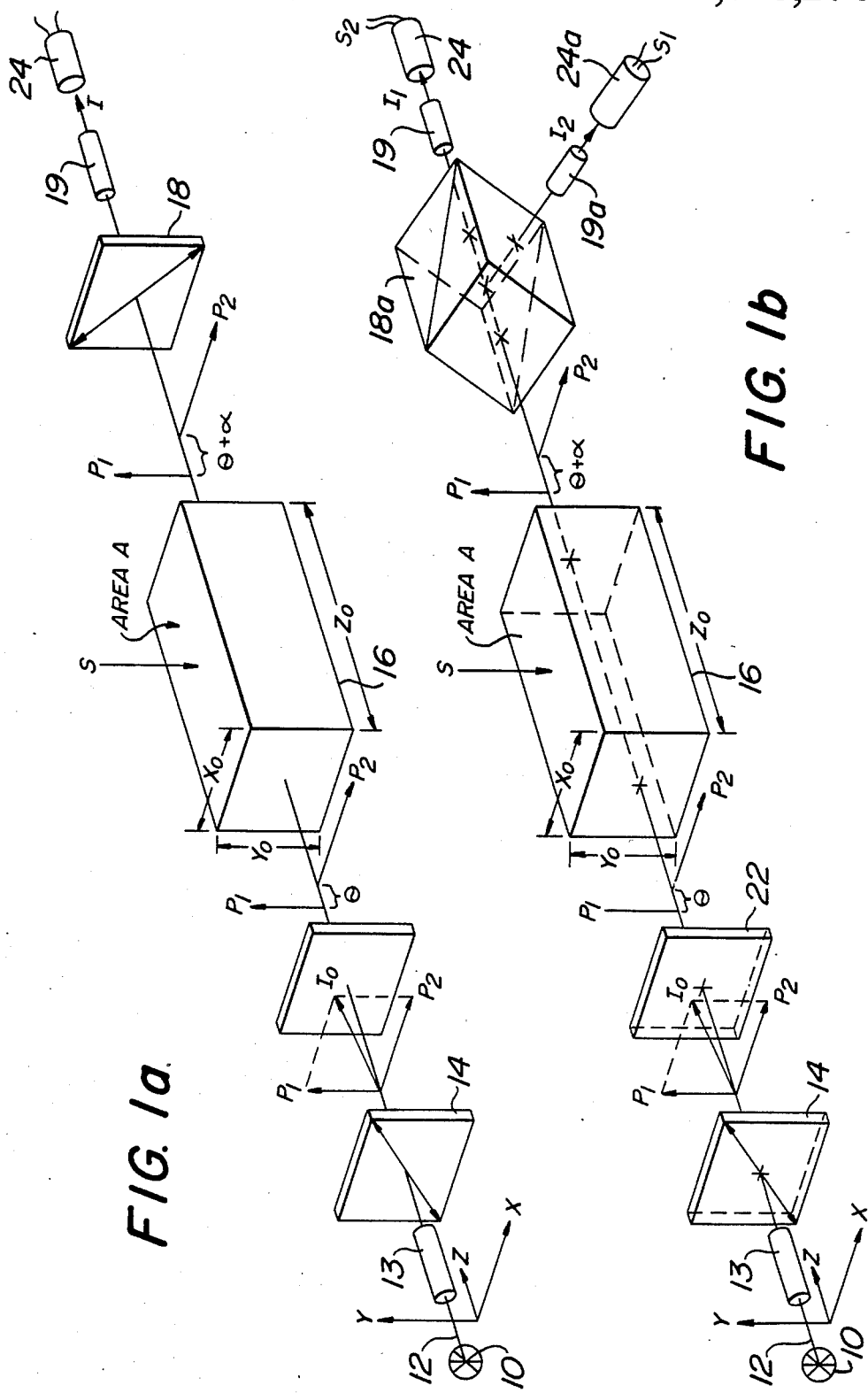
FIG. 1a is a perspective drawing showing the basic structure of photoelastic transducers of the type with which this invention is concerned.
FIG. 1b is a perspective drawing showing a variation of FIG. 1a which incorporates the present invention.

This principle is illustrated in FIGS. 1a and 1b, which shows a light source 10, which may be a laser, producing a light beam 12 which passes through a fiber optic 13 and is polarized by polarizer 14 to provide a polarized beam of power $I_0$ directed at the photoelastic body 16 with the plane of polarization being at 45° to the axis, y, of the principle stress, S. The axis of the principle stress defines two polarization components of interest; namely, $P_1$, which is parallel to the stress axis, and $P_2$ which is perpendicular to the stress axis. These components each are subjected to a different refractive index as they travel through the stressed material of body 16 creating a phase difference between the components which is dependent on the length of the path through the body 16, as well as the magnitude of the stress, S. This phase difference is shown as $\alpha$ (ignoring for the moment the phase difference, $\theta$) and is detected by a polarizer 18, called an analyzer. If the plane of polarization of the analyzer is perpendicular to the initial polarization of the light beam 12 entering the photoelastic body 16, and if it is at 45° to the stress axis, as shown in FIG. 1a, the light, of power I, passing out of the analyzer will be a sine squared function of the stress. Namely:

$$I = I_0 \sin^2 (kS) \quad (1)$$

where k is a constant and $\alpha/2 = kS$. This function is plotted in FIG. 2a.

As will be evident from an examination of FIG. 2a, the output optical power, I, is insensitive to small stresses such as would be present in an accelerometer constructed in accordance with this principle, as thus far explained. Both the sensitivity and the linearity of I can, however, be increased by inserting into the beam 12 of the arrangement of FIG. 1a a birefringent wave plate 22. This wave plate creates a constant phase shift, $\theta$, independent of the transducer stress. For $\theta$ equal to $90\pi$, the sine squared function is shifted to the optimum phase for linearity and sensitivity, as shown in FIG. 2b. The relationship between the optical power I and the stress S would then be:

$$I = I_0 \sin^2 (kS + \theta/2) \quad (2)$$

with $\theta = \lambda/2$.

Thus, the configuration of the polarized incident light beam, the wave plate, the optical material of the body, and the analyzer, as shown in FIG. 1a, define a stress to optical (photoelastic) transducer in which a photocell 24 measures the output power I of the light beam 12 after it has been transmitted through fiber optic 19, and the photocell 24 produces an output which varies in proportion to the changes in the stress, S.

FIG. 3 shows a physical arrangement of parts which can be used to make a simple accelerometer in which the acceleration of the mass M is converted into a stress in the optical material by virtue of the inertia of the mass. The mass is affixed to the top surface of the optical element, as by cementing, and the bottom surface of the optical element is mounted on a case 30, which is in turn affixed to the vibrating surface 28 by a stud bolt 32.

The acceleration of the mass due to the vibration of the surface 28 creates stress in the optical element which can be measured as a measure of acceleration. This stress, however, is not constant for all vibration frequencies. The optical element acts mechanically like a combination of spring and viscous damper. The frequency response characteristic of such a system is shown in FIG. 4. This characteristic shows that the ratio of stress to acceleration (S/a) is constant at low frequencies. At the resonant frequency, $f_n$, the stress response increases to a peak and then falls at higher frequencies. Therefore, the mechanical properties of the optical element determines the useful frequency bandwidth of the accelerometer. The relationship of $f_n$ to the physical propeties of a rectangular optical element, with dimensions $X_0$, $Y_0$, and $Z_0$ and a Young's modulus, E, when the stress, S, due to inertial mass M is uniform over the area, A, of the optical element, can be expressed as $$f_n = \tfrac{1}{2}\lambda(EA/MY_0)^{\tfrac{1}{2}} \quad (3)$$

The optical material should be stiff (high Young's modulus) and thin (small $Y_0$) for a large frequency bandwidth. Reduction of the inertial mass will also increase $f_n$, but at the expense of acceleration sensitivity. This trade-off between bandwidth and sensitivity is better resolved by the relationship between photoelastic and mechanical properties. The optical power is a function of the stress (S), the total light path (l) in the optical element, and the element's fringe value (F), a photoelastic constant. The stress, of course, is force per unit area (A) and the force is the product of mass (M) and acceleration (a). Thus, $$I = I_0 \sin^2\left[\frac{\pi l Ma}{FA} + \frac{\pi}{4}\right], \quad (4)$$

and for small accelerations, I is approximately the sum of a constant D.C. term and a time varying A.C. term, which changes with acceleration, a. Thus, for small accelerations $$I = I_0/2 + I_0 \lambda l Ma/FA, \quad (5)$$

where the first term is the D.C. component, $I_{dc}$. Thus, $$I_{dc} = I_0/2, \quad (6)$$

and the second term is the A.C. term, $I_{ac}$. Thus, $$I_{ac} = I_0 \lambda l Ma/FA. \quad (7)$$

The important noise sources in the accelerometer, when fiber optics are used for transmission, is light-source power fluctuations and fiber optic microbending and macrobending losses, which scale proportionally with the D.C. component. A response function R, which describes the acceleration sensitivity normalized to the D.C. component to facilitate normalized signal to noise comparisons, can be expressed as follows:

$$R = \frac{1}{I_{dc}} \left[ \frac{dI_{ac}}{da} \right] = \frac{2\pi l M}{FA}, \tag{8}$$

This normalized sensitivity is related to the resonant frequency by combining equations (6) and (7) to get R as the normalized change in output power for an acceleration change of one gravitational unit, g. Thus, $$R = \frac{156}{f_n^2} \left[ \frac{E}{F} \right] \left[ \frac{Z_0}{Y_0} \right]^{g-1}, \text{ for } \frac{E}{F} \text{ in cm}^{-1} \tag{9}$$

The frequency bandwidth and sensitivity are limited by the size constraints of the accelerometer. $Z_0$ (FIG. 1a) must be less than 20 mm for a typical accelerometer size of one cubic inch, and $Y_0$ should be at least 2 mm to allow efficient coupling of light into the optical element from a multimode fiber optic. A steel inertial mass of typical size, less than 6 cubic centimeters, weighs about 40 grams. In view of these constraints, several different materials were considered for the photoelastic material; (EPON) 828 epoxy, polycarbonate, and pyrex glass. The response of these materials is very similar because the difference in Young's Modulus and the Fringe value tend to cancel each other in the E/F coefficient. However, the width $X_0$ required to obtain a good response differs dramatically among these materials. For example, to obtain a good response, the width of a pyrex element would have to be less than 2 mm, which would produce an unstable mechanical structure. EPON 828 and polycarbonate have excellent response for wider elements, but they are not mechanically stable at temperatures greater than 100° C. The glasses such as pyrex are good candidates for high temperature applications, but the low level of their response will be swamped by other noise sources in the system.

The low noise levels in available optical detectors facilitate the measurement of the small optical signals such as are produced by this type of transducer, however, since the A.C. signal component is very small compared to the D.C. component, any noises in the D.C. component will swamp the A.C. component.

Since noise sources, such as laser diode intensity fluctuations and acoustically induced microbending or macrobending losses in the fiber optics, can reach levels equal to that of the acceleration signal, the signal-to-noise ratio must be enhanced. One might expect that choosing materials with lower fringe values would significantly increase the acceleration response. This would not be the case, however, because these sensitive materials typically have a lower Young's Modulus and are limited by resonant frequency considerations. Also, these materials are usually polymers, which have low melting points and low critical temperatures, thus making them unsuitable for industrial surroundings. Applicant has found a way to accomplish the desired enhancement of the signal-to-noise ratio by using differential detection and by increasing the acceleration response. Thus, the glasses which are the best choice for a stable, high bandwidth accelerometer can be used. However, their low level of response must be enhanced by some means. Applicant has been able to do this by increasing the optical path length, 1, inside the glass, through the use of multiple internal reflections.

Figure 5A:
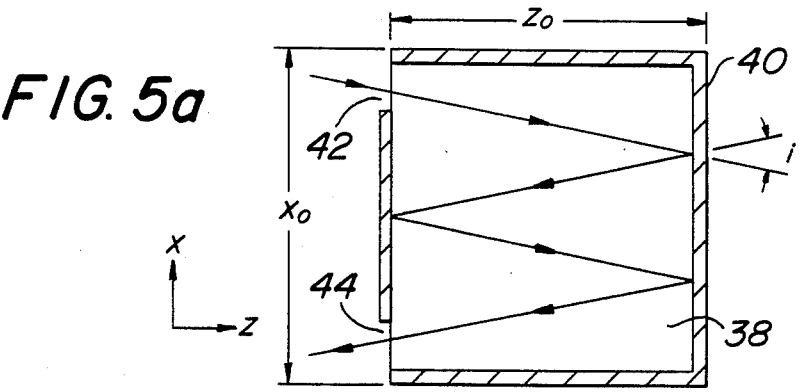
FIG. 5a–5e shows various configurations for the photoelastic body which can be used to obtain multiple internal reflections.

FIGS. 5a–5e shows various configurations which can be used for the photoelastic body to provide for multiple reflections inside the element itself. All views except 5c are cross sections taken across the y axis, the stress axis. In the configuration of FIG. 5a, four end surfaces of a rectangular optical element 38 have a reflective aluminized coating 40, providing two small access holes 42 and 44 for light to enter and leave the element. The entrance hole 42 must be larger than the beam diameter and the beam incidence angle i must be large enough for the second reflection to miss the entrance hole. This constraint, of course, limits the number of passes inside the optical element.

Figure 5B:
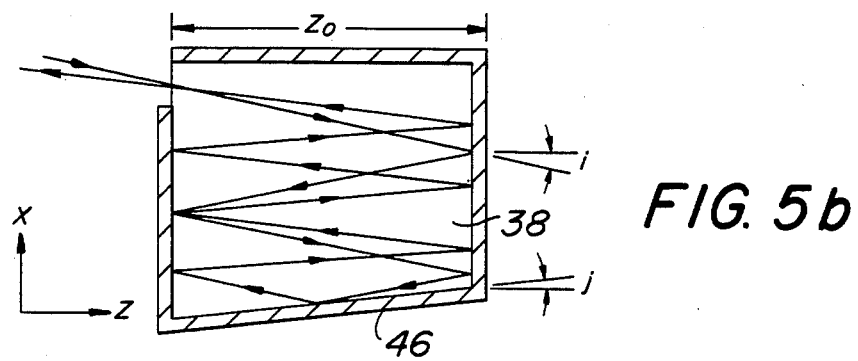

In the configuration of FIG. 5b the number of passes is increased by tilting one surface of the optical element 38. The light enters the element at an incident angle similar to that in FIG. 5a and propagates down the element as in FIG. 5a. The third side of the element, 46, is tilted at an angle j which redirects the beam at a shallow angle. Without an exit hole, the beam propogates back up the element with many more reflections, and it exits through the entrance hole. The magnitude of the entrance angle no longer limits the number of reflections and the length of the optical path is substantially increased by the tilted side.

Figure 5C:
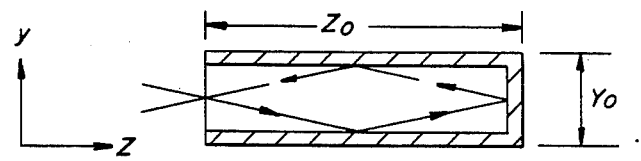

When the total optical path is very large, the exit beam may be larger than the access hole, due to beam divergence. Part of the beam is then reflected back into the element and this light emerges again after more internal reflection. Light can also be lost on top and bottom surfaces, due to beam divergence in the y direction. A reflective coating or low refractive index cladding will prevent these losses in a configuration such as shown in FIG. 5c.

Figure 5D:
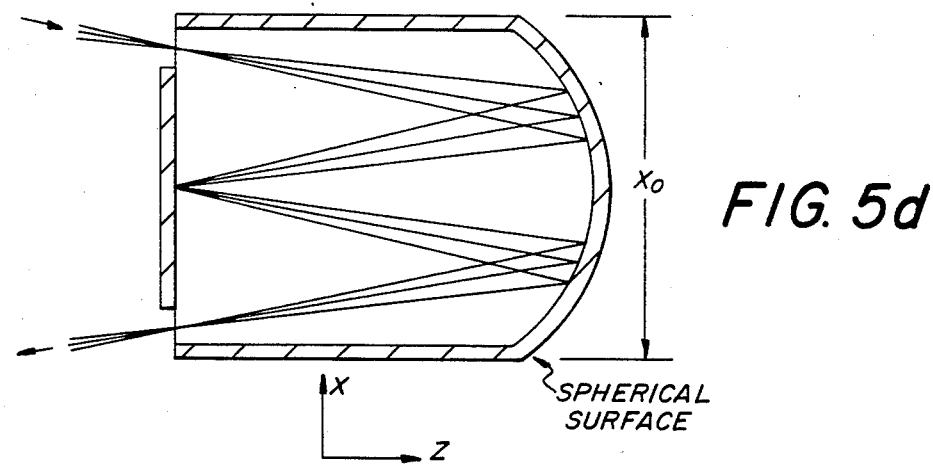
Figure 5E:
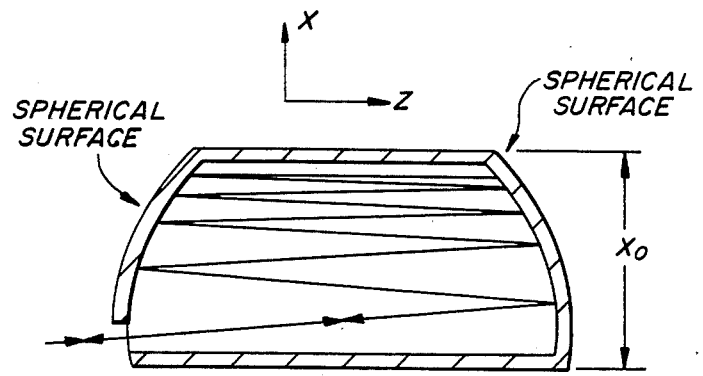

The use of spherical or curved end surfaces, in addition to providing multiple reflections, will also reduce beam divergence problems, as shown in FIGS. 5d and 5e. In these designs the entrance and exit beams are identical because the beam spread, in both x and y directions, is controlled by the focusing power of the spherical surfaces. These designs may also require less critical alignment than those of FIG. 5a and 5b, but they are more expensive to manufacture.

Through multiple reflections of the type described above, the response can be increased up to the point where the sine squared non-linearity is excessive. A spectral analysis of vibration shows that this non-linearity produces odd harmonics. For example, when the A.C. signal component is 12% of the D.C. component, the third harmonic is 1% of the fundamental frequency component. Without correction, non-linearity then is the ultimate sensitivity limitation for the accelerometer.

As has been pointed out, when immunity to electrical noise is desired a complete optical accelerometer system may use fiber optic transmission cables for transmitting from a light source to and from the accelerometer transducer. The light source and the light detectors required for measuring the intensity of the light signals returning from the transducer can then be located in a remote receiver. One design for a complete accelerometer using the present invention is shown in FIG. 1b, which omits the receiver for simplicity. In FIG. 1b the light source 10 transmits through the fiber optic 13 to the polarizer 14 and through the photoelastic element 16 to an analyzer which is different from the analyzer of FIG. 1a. In this case the analyzer is a polarizing beamsplitting cube 18a, which is like the polarizing beamsplitter cube 58 of FIG. 6.

Polarizing beam splitters consist of two coated isosceles prisms permanently cemented together on the hypotenuse faces to form a solid cube. The hypotenuse faces have multilayer-dielectric, polarization-selective beamsplitter coatings. The resulting cube splits an unpolarized input beam into an undeviated (transmitted) component and a 90° deviated (internally reflected) component.

Figure 6:
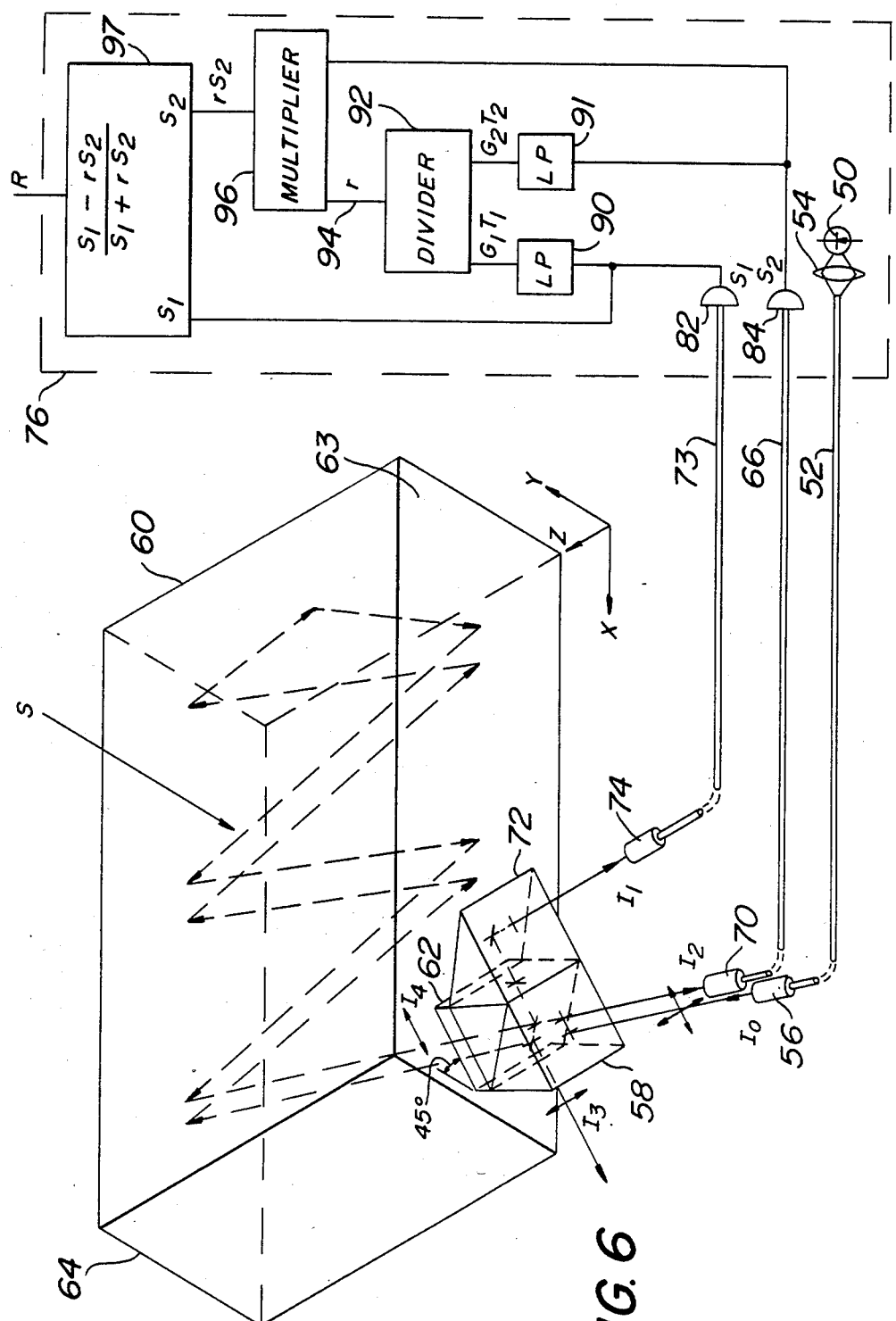
FIG. 6 is a perspective drawing of the photoelastic element and associated optical elements of a complete accelerometer system, including the electrical circuit required to interpret the output of the optical system.

In FIG. 1b light polarized along the axis of $I_0$ is reflected by the polarizing beamsplitter to a transmitting fiber optic 19a and is identified as having an intensity $I_2$. Also, the orthogonal polarization is transmitted to fiber optic 19 and is identified as having an intensity $I_1$. The intensity $I_2$ is measured by the photocell 24a and the intensity $I_1$ is measured by photocell 24 to obtain the respective electrical output signals $S_1$ and $S_2$. FIG. 1b is an improvement of the arrangement shown in FIG. 6 of the referenced patent in that a single light beam is used and the two analyzers of the referenced FIG. 6 are replaced with a single polarizing beamsplitter cube which will analyze for both orthogonal planes and provide the same two signals as are provided by the referenced patent. By using a single beam, the accuracy will be enhanced considerably, for differences in the output signals, which normally occur in using duplicate light paths, will not be a problem. The signals $S_1$ and $S_2$ are utilized in the same way as will be described in connection with the receiver of FIG. 6 to obtain the final signal, indicative of the acceleration or other variable.

FIG. 6 is a variation of the arrangement of FIG. 1b, which provides increased sensitivity by using multiple internal reflections in the photoelastic element. Less components are required in this arrangement, for the polarizing beamsplitter provides both the polarization and the analysis of the orthogonal components.

In FIG. 6 a laser diode or light emitting diode 50 is focused into a fiber optic 52 by a lens 54 so that the fiber optic can transmit the light to the optical accelerometer. This light is of intensity $I_0$ and it enters the accelerometer through a GRIN lens 56. GRIN lenses are gradient index rod lenses which have refractive indexes which vary parabolically as a function of the radius. The light beam $I_0$ enters through a polarizing beam splitter 58 oriented to polarize the light at a 45° angle to the stress axis (the Y axis) of the optical element 60. The transmitted component is polarized along the axis shown for $I_4$ and the reflected component is polarized along the orthogonal axis and shown as $I_3$. The transmitted polarization $I_4$ enters the optical element through a wave plate 62 which produces a 45° phase shift, with its fast axis along the Y axis. After passing through the phase plate the light is elliptically polarized. Because of the reflective coating on the front and back faces, 63 and 64, of the optical element, multiple reflections occur in the optical element, as shown. As a result of the multiple reflections, the light passes back through the wave plate and the polarized beam splitter. On this return pass another phase shift of 45° is added to produce a total shift of 90°, and the transmitted component $I_2$ is transmitted to a fiber optic 66 through a GRIN lens 70 while the polarization component $I_1$, which is orthogonal to the input light polarization $I_4$, is reflected by the polarizing beam splitter and prism 72 to a fiber optic 73 through the GRIN lens 74. As shown in FIG. 6, the prism 72 is cemented to one of the exit faces of the beam splitter.

One useful variation on the design of FIG. 6 would be provided by replacing the wave plate with an internal reflection prism made of dense flint glass. The resulting phase shift may be found to be less temperature sensitive than the shift due to the wave plate of FIG. 6.

In FIG. 6 the fiber optics 52, 66, and 73 are connected to receiver 76 which provides the needed signal analysis for producing a signal related to acceleration. Photocell detectors 82 and 84 detect the light signals in fiber optics 73 and 66, respectively, and provide at their outputs the corresponding electrical signals $S_1$ and $S_2$.

It is important in detecting very small signals transmitted through fiber optic transmission cables, such as might result from accelerations of 1 milli-g to compensate for the losses in the fiber optics due to absorption and to microbending and macrobending. Applicant has found that the above mentioned losses can be compensated for if they are substantially equal in both fibers 66 and 73, for example. This compensation can be effected by computing the output signal in accordance with the equation:

$$\text{the resulting signal } R=(S_1-S_2)/(S_1+S_2) \tag{10}$$

This calculation can, of course be made by any method which is algebraic equivalent, such as by the equation:

$$R = \frac{1 - S_2/S_1}{1 + S_2/S_1}. \tag{11}$$

The above calculations of R assume that the transmission through the fiber optics is constant, as is generally the case once the fiber optics are connected, and as long as they are not disconnected and then reconnected. If it is desired to take into account the need for disconnecting the fiber optics and reconnecting them, the following equation should be used to determine the final output signal.

$$R = \frac{S_1 - rS_2}{S_1 + rS_2} \tag{12}$$

$$\text{where } r = \frac{S_{1dc}}{S_{2dc}} \tag{13}$$

$S_{1dc}$ and $S_{2dc}$ are the D.C. components of the signal.

$$\text{Thus } r = \frac{G_1 T_1}{G_2 T_2}, \tag{14}$$

and $G_1$ and $G_2$ are the detector gains for the detectors 82 and 84, respectively, which measure $S_1$ and $S_2$. $T_1$ and $T_2$ are the transmission factors for the fiber optic cables 73 and 66, respectively and their connectors. The use of this method for calculating the final output signal R makes it unnecessary to recalibrate the equipment every time the fiber optics are disconnected and then reconnected.

There is shown in FIG. 6, one circuit for the receiver 76, which can be used to calculate R in accordance with equation (12). In that circuit, the outputs of the photocell detectors are connected to low pass filters, such as filters 90 and 91. The outputs of these filters is essentially the D.C. components of the signals $S_1$ and $S_2$, respectively. Therefore, these outputs are equal to the detector gain G times the fiber transmission factor T for the respective signals. The two D.C. components are divided by the divider 92 to produce r, the ratio of the two components, on line 94. The signal on line 94 is then multiplied by the signal $S_2$ by multiplier 96 to produce an output signal from the multiplier equal to $rS_2$, which is then fed into the $S_2$ input of the computational module 97. This computational module may be a standard module which provides an output which is equal to the ratio of the difference to the sum of its two inputs. Such a module is the Burr Brown 4213. As is shown in FIG. 6, the $S_1$ input to the module 97 is derived from detector 82 as signal $S_1$. The output signal R of the module 97 is then the signal R defined by equation (12) and is a measure of the acceleration detected by the optical element 60, which measure is independent of the variations in the microbending losses, the macrobending losses, the changes is source intensity, and changes in the fiber optic transmission factor.

Figure 7:
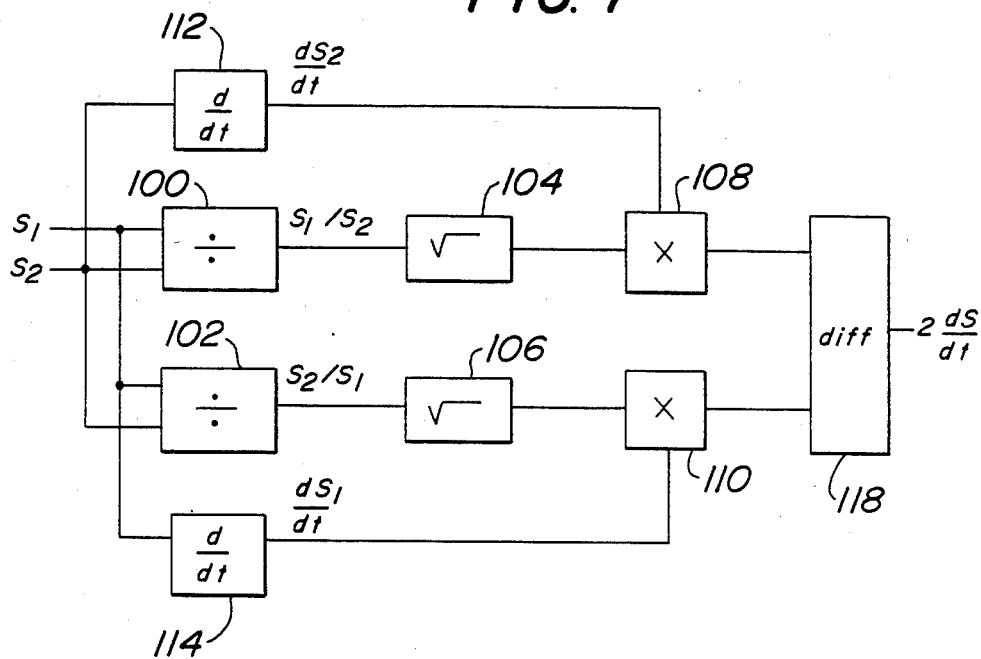
FIG. 7 is a block diagram of another circuit which can be used to analyze the output signals from the optical system of this invention.

Other possible circuits for analyzing the signals $S_1$ and $S_2$ can include that shown as FIG. 7. The circuit of FIG. 7 is useful in making the final measurement independent of the changes which can occur in the wave plate 62 of FIG. 6 due to temperature changes. Such independence can make possible the use of cheaper wave plates than would otherwise be necessary.

In FIG. 7, the signals $S_1$ and $S_2$ are divided in the two possible ways by the dividers 100 and 102 to produce $S_1/S_2$ and $S_2/S_1$, respectively. Those quantities are then inputed to the square root circuits 104 and 106, respectively, and the outputs of those circuits provides one input to corresponding multipliers 108 and 110. The other inputs to the multipliers are from the derivative circuits 112 and 114 whose respective inputs are from $S_2$ and $S_1$. The outputs of the multipliers is then fed to a differencing circuit 118 which produces the final output R which is equal to $2(dS_2/dt)$. Thus, the circuit of FIG. 7 calculates the output signal in accordance with the following equation:

$$R=[(S_2/S_1)^{\frac{1}{2}}dS_1/dt-(S_1/S_2)^{\frac{1}{2}}dS_2/dt]=2dS/dt. \quad (15)$$

The final output signal determined by equation (15) will tend to be independent of the microbending losses as well as changes in wave plate due to temperature changes and similar factors.

While this invention has been described by reference to an optical system which uses discrete components, such as the polarizing beam splitter cube and the associated prism of FIG. 6, as separate discrete elements from the photoelastic optical element, it will be understood by those skilled in the art that the system may be constructed by using an integrated element or integrated optic approach, whereby the polarizing beam splitting function and the wave plate function, as well as any other functions required, are carried out by the incorporation of those functions into the structure of the photoelastic optical element itself, using known techniques.

What is claimed is:

1. A photoelastic measuring transducer, comprising:
    a photoelastic element which exhibits a degree of birefringence which varies in proportion to variations in the amount of stress applied along an axis of the element, said stress being proportional to the variable to be measured, said photoelastic element being constructed to provide multiple internal reflections of light beams solely in a plane of internal reflection substantially normal to the stress axis so as to lengthen the optical path in said element;
    means for providing a single beam only of plane polarized light directed at said element at an angle for propagation through said element in said plane of internal reflection with its plane of polarization at an angle with the axis of said stress;
    means for producing a phase difference between two perpendicular components of the polarized light beam one of which is along the stress axis;
    polarizing analyzer means for passing a first quantity of luminous flux of the beam transmitted by said element and polarized in a plane perpendicular to the plane of polarization of said incident beam and a second quantity of luminous flux polarized in a plane parallel to the plane of polarization of said incident beam;
    first and second photocells for converting said first and second quantities of luminous flux into corresponding first and second electrical signals proportional to said quantities; and
    means for combining functions of said first and second electrical signals as required to calculate the magnitude of the variable to be measured.

2. A photoelastic measuring transducer, as set forth in claim 1, in which:
    said means for providing a single beam only of plane polarized light and said polarizing analyzer means are both provided by a single polarizing beam splitter cube.

3. A photoelastic measuring transducer, as set forth in claim 1, in which:
    said element is a rectangular parallelapiped constructed to provide multiple internal reflections by having its planar surfaces parallel to the stress axis provided with a reflective coating.

4. A photoelastic measuring transducer, as set forth in claim 1, in which:
    said element has one reflective face at an angle other than 90° to the other reflective faces to provide a reflection of the beam which causes the beam to propagate back on along its original path.

5. A photoelastic measuring transducer, as set forth in claim 1, in which:
    at least one of the reflective faces of said element is curved in shape.

6. A photoelastic measuring transducer, as set forth in claim 1, in which:
    all of the reflective faces of said element are curved in shape.

7. A photoelastic measuring transducer, as set forth in claim 1, in which
    the first and second signals are combined by dividing the difference between them by their sum where one of the signal values is in the numerator and the denominator are multiplied by the ratio of the D.C. component of the other signal to that of the present signal.

8. A photoelastic measuring transducer, as set forth in claim 1, in which
    fiber optics means are provided to transmit said first and second quantities of luminous flux to said first and second photocells where said first and second electrical signals, $S_1$ and $S_2$, are generated; and said means for combining the first and second electrical signals to calculate the magnitude of the variable to be measured (R) combines those signals as a function of a quantity equal to the difference between the first and second electrical signals all divided by the sum of those signals, as follows:

$$R=(S_1-rS_2)/(S_1+rS_2)$$

where r is the ratio of the D.C. components of the signals $S_1$ and $S_2$.

9. A photoelastic measuring transducer as set forth in claim 1, in which
said means for combining said first and second electrical signals determines the difference between the rates of change of the two signals with those rates of change each being modified by a factor equal to one half of the square root of the ratio of the other signal to the present signal.

10. A photoelastic measuring transducer, as set forth in claim 1, in which:
fiber optics means are provided to transmit said first and second quantities of luminous flux to said first and second photocells where said first and second electrical signals are generated; and
said means for combining the first and second electrical signals ($S_1$ and $S_2$) to calculate the magnitude of the variable to be measured (R) combines those signals in accordance with the following equation:

$$R=[(S_2/S_1)^{\frac{1}{2}}dS_1/dt-(S_1/S_2)^{\frac{1}{2}}dS_2/dt]=2dS/dt.$$

11. An improved photoelastic measuring transducer, comprising:
a photoelastic element;
means for inducing stress into said element along an axis of the element so that the magnitude of the stress is a known function of a variable to be measured;
means for providing a single beam only of plane polarized light incident on said element and directed for propagation through said element in a plane substantially normal to said stress axis and with the plane of polarization at an angle of 45° with the axis of said induced stress;
a coating on said element for providing multiple internal reflections of said beam solely in said plane before said beam exits from said element;
a wave plate inserted in said beam with its orthogonal components at 45° to said plane of polarization;
polarizing analyzer means for passing a first quantity of luminous flux of the beam exiting from said element and polarized in a plane perpendicular to the plane of polarization of said incident beam and a second quantity of luminous flux polarized in a plane parallel to the plane of polarization of said incident beam;
fiber optic means for transmitting said first and second quantities of luminous flux to a location where indication of the magnitude of the quantity being measured is desired;
first and second photocells at said location for converting said first and second quantities of luminous flux transmitted by said fiber optic means into corresponding first and second electrical signals proportional to said quantities; and
means for calculating the magnitude of said variable to be measured as a function of the difference between the first and second electrical signals all divided by the sum of those signals, whereby the resulting measurement is free of the effects of vibration induced microbending noise in the fiber optics and amplitude noise in the incident light beam.

12. An accelerometer for vibration monitoring comprising:
a base for attachment to a unit whose vibration is to be monitored;
a photoelastic element attached to said base, said element having a reflective coating to produce multiple internal reflections of light beams incident on said element;
an inertial mass attached to said photoelastic element to produce stress along an axis of said element of magnitude related to the acceleration of said mass when vibration of said base occurs;
means for providing a single beam only of plane polarized light incident on said element in a direction to produce said multiple internal reflections solely in a plane of internal reflection substantially perpendicular to said stress axis, said beam being plane polarized at an angle of 45° with said stress axis;
wave plate means for producing a phase shift of 90° between two perpendicular components of said polarized light beam, one of which is along the stress axis;
polarizing analyzer means for passing both a first quantity of luminous flux of the beam exiting said element with a polarization angle perpendicular to the plane of polarization of said incident beam and a second quantity of luminous flux exiting said element with a polarization angle parallel to the plane of polarization of said incident beam;
fiber optic means for transmitting said first and second quantities of luminous flux to a location where indication of the magnitude of the acceleration being measured is desired;
first and second photocells at said location for converting said first and second quantities of luminous flux transmitted by said fiber optic means into corresponding first and second electrical signals proportional to said quantities; and
means for calculating the magnitude of said acceleration as a function of a quantity equal to the difference between the first and second electrical signals all divided by the sum of those signals, whereby the resulting measurement is free of the effects of vibration induced microbending noise in the fiber optics and amplitude noise in the incident light beam.

13. An improved photoelastic measuring transducer comprising:
a photoelastic element having a reflective coating to produce multiple internal reflections of light beams incident on said element for propagation through said element along a plane of internal reflection;
means for inducing stress into said element along an axis of the element substantially normal to said plane of internal relection so that the magnitude of the stress is a known function of a variable to be measured;
means for providing a single beam only of plane polarized light incident on said element in a direction to produce said multiple internal reflections solely in said plane of internal reflection, said beam being plane polarized at an angle of 45° with said stress axis;

wave plate means for producing a phase shift of 90° between two perpendicular components of said polarized light beam, one of which is along the stress axis;

polarizing analyzer means for passing the luminous flux of the beam exiting said element with a polarization angle either perpendicular or parallel to the plane of polarization of said incident beam; and a photocell for converting said luminous flux into a corresponding electrical signal of magnitude related to said variable to be measured.

14. An improved photoelastic measuring transducer comprising:

a photoelastic element having a reflective coating to produce multiple internal reflections of light beams incident on said element for propagation along a plane in said element;

means for inducing stress into said element along an axis of the element normal to said plane so that the magnitude of the stress is a known function of a variable to be measured;

means for providing a single beam only of plane polarized light incident on said element in a direction to produce said multiple internal reflections solely in said plane, said beam being plane polarized at an angle of 45° with said stress axis;

wave plate means for producing a phase shift of 90° between two perpendicular components of said polarized light beam, one of which is along the stress axis;

polarizing analyzer means for passing both a first quantity of luminous flux of the beam exiting said element with a polarization angle perpendicular to the plane of polarization of said incident beam and a second quantity of luminous flux exiting said element with a polarization angle parallel to the plane of polarization of said incident beam;

first and second photocells for converting said first and second quantities of luminous flux into corresponding first and second electrical signals proportional to said quantities; and means for calculating the magnitude of said measured quantity as a function of the first and second electrical signals.

* * * * *